United States Patent
Kawakami et al.

(10) Patent No.: US 6,185,193 B1
(45) Date of Patent: Feb. 6, 2001

(54) DESIGNING SYSTEM AND METHOD FOR COMPUTER-AIDED ACCESS COMMUNICATION NETWORKS

(75) Inventors: Hiroyuki Kawakami; Hiroyuki Okazaki, both of Tokyo (JP)

(73) Assignee: NEC Corporation, Tokyo (JP)

(*) Notice: Under 35 U.S.C. 154(b), the term of this patent shall be extended for 0 days.

(21) Appl. No.: 09/046,629

(22) Filed: Mar. 24, 1998

(30) Foreign Application Priority Data

Jul. 4, 1997 (JP) .................................................. 9-195100

(51) Int. Cl.$^7$ .................................................. H04L 12/28
(52) U.S. Cl. .......................... 370/254; 370/259; 370/238; 370/351
(58) Field of Search .................................. 370/254, 259, 370/238, 351

(56) References Cited

U.S. PATENT DOCUMENTS 5,508,999 * 4/1996 Cox, Jr. et al. ...................... 370/252

FOREIGN PATENT DOCUMENTS 4-316167   11/1992 (JP) .

OTHER PUBLICATIONS

Filho et al, "A Software Planning Tool for A Business Oriented Optical Access Network—PREST", IEEE Global Telecommunications Conference, pp. 1952–1956, vol. 3, Nov. 1995.*

Senior et al, "Optical Fibre Local Access Network Software Tools", Singapore ICCS/ISITA, pp. 1332–1336, vol. 3, Nov. 1992.*

Dal Bono et al, "Multi–Service Digital Access Network Planning with the Expert System RAMSES", First International Conference on Expert Planning System, pp. 48–51, 1991.*

H. Kawakami et al., "A Design Support System for Access Networks by Using Existing Resources", The Institute of Electronics, Information and Communication Engineers, 1997.

* cited by examiner

Primary Examiner—Huy D. Vu
Assistant Examiner—Dung Trinh
(74) Attorney, Agent, or Firm—McGuireWoods LLP

(57) ABSTRACT

An access communication network to make possible automatic designing a lower cost access communication network under various constraints by using existing equipment on the basis of demand information is to be provided. The equipment is classified into communication equipment and civil-engineered equipment; information is given, before automatic designing, as to whether each item of equipment is to be deleted or its position is fixed to use its unoccupied capacity; and allows the designer to freely define an eligible deployment site for the equipment and thereby to calculate the configuration of a low deployment cost access communication network and civil-engineered equipment needed therefor. First, equipment information is read in (21), parameters including the number of current additional demands, the cost of each equipment item and the design policy are defined (22), the communication/civil-engineered equipment items are edited if necessary (24), designation is given for each equipment item whether or not to use it in automatic designing by an addition formula (24), and a low deployment cost access communication network is calculated by fixing the positions of those items of equipment for which the addition designing mode is designated and using them as being free of additional equipment cost.

8 Claims, 8 Drawing Sheets

DESIGNING SYSTEM AND METHOD FOR COMPUTER-AIDED ACCESS COMMUNICATION NETWORKS

BACKGROUND OF THE INVENTION

The present invention relates to a designing system for computer-aided access communication networks, and more particularly to a designing system for computer-aided access communication networks for calculating the configuration of low deployment cost access communication networks to satisfy given demands under constraints regarding the quality of communication, positioning of equipment deployment among other factors, and civil-engineered equipment needed therefor.

Published achievements of the related prior art include (1) the Gazette of the Japanese Patent Laid-open no. Hei 4-316157 and (2) a paper by Hiroyuki Kawakami et al. contained in the 1996 Communications Society Convention of the Institute of Electronics, Information and Communication Engineers, B-792, 1996.

In these prior art designing systems for access communication networks, the equipment involved is not definitely classified into communication equipment and civil-engineered equipment, and moreover, when automatic designing is to be accomplished, the network designer can make neither editing nor definition regarding what to do with the existing equipment.

More specifically, even if there already is some equipment, everything has to be deleted and, the existing equipment being supposed to be inexistent, the configuration of a low deployment cost access communication network and the position of its deployment should be calculated anew under constraints regarding the quality of communication among other factors, from geographical information, subscription demand information, equipment information and, in addition to them, design parameter information.

However, the conventional access network designing system referred to above involves the following problems.

First, it permits no design which reuses existing communication equipment and civil-engineered equipment related to a narrowband access communication network, whose scenario is the most common for the development of a broadband access communication network base.

The reason is that communication equipment and civil-engineered equipment are not classified for discrete management.

Second, it does not allow the network designer to define the eligible site for the deployment of the equipment as he or she prefers.

The reason is the use of a system by which the eligible site for deployment is not edited and merely attributes are extracted from map data as keys.

Third it permits no automatic designing by an addition formula in which the location of the equipment is designated in advance of automatic designing or reuse only the unoccupied capacity with the existing equipment location being fixed, and therefore neither a design with limitation of the equipment site nor a design to reduce cost by reuse of existing equipment is possible.

The reason is that it is important to use only the unoccupied capacity of each equipment unit, whose position is fixed, or give a designation allowing deletion.

SUMMARY OF THE INVENTION

Therefore, an object of the present invention is to provide a designing system for access communication networks, which makes possible automatic designing of a less costly access communication network under various constraints on the basis of demand information by using existing equipment.

According to the invention, there is provided, to achieve the foregoing object, an access communication network designing system for automatically calculating the configuration of an access communication network to reduce the deployment cost and its deployment position from geographical information within the design area, subscription demand information, equipment information and design parameter information including the initial accommodation rate, comprising: equipment defining means for defining positional information and equipment information, making distinction between communication equipment including apparatuses, cables, and management or control systems; and civil-engineered equipment including ducts and aerial wiring; eligible deployment site defining means for defining a site where the communication and/or civil-engineered equipment can be deployed; and automatic designing means for automatically calculating the configuration of a low deployment cost access communication network and civil-engineered equipment needed therefor by an addition formula which, on the basis of edit inputs or already automatically calculated equipment information, prohibits any shift or deletion of existing equipment and thereby keeps already accommodate lines unaffected.

According to the invention, said equipment defining means may be provided with communication equipment defining means for a network designer to edit and/or define the types and positions of communication equipment including apparatuses, cables, management or control systems and, in automatic designing, whether or not to fix the positions of these items of communication equipment and use unoccupied capacities, and civil-engineered equipment defining means for a network designer to edit and/or define the types and positions of civil-engineered equipment including ducts, aerial wiring and, in automatic designing, whether or not to fix the positions of these items of civil-engineered equipment and use unoccupied capacities; and calculate the configuration of the access communication network and the civil-engineered equipment needed therefor.

Also according to the invention, said eligible deployment site defing means may be provided with eligible deployment site extracting map for designating attributes of a map object from map data and extracting it as an eligible deployment site for equipment; and deployment site editing means for the network designer to edit the eligible deployment site as he or she prefers; and calculate the configuration of the access communication network and the civil-engineered equipment needed therefor.

And according to the invention, said automatic designing means may judge from the information designated by said equipment defining means whether or not to use communication and/or civil-engineered equipment; if any is to be used, only use the unoccupied capacities of existing equipment without shifting or deleting any existing equipment; and automatically calculate the configuration of a low deployment cost access communication network and civil-engineered equipment needed therefor.

A first access communication network designing system according to the invention has means for classifying equipment into communication equipment and civil-engineered equipment, and defining them; means for designating each item of equipment to be usable and unusable in automatic designing by an additional formula; and means for prohibiting editing of any item of equipment for which an addition designing mode has been defined to protect existing equipment.

A second access communication network designing system according to the invention has means of designating a deployment site for equipment by attributes of roads and the like and extracting it from map data; and means for the designer of the communication network to edit the attributes as he or she prefers.

It may further have means for automatically designing a low deployment cost access communication network according to whether or not each item of equipment, as defined for that item, is to be used in automatic designing.

The means for classifying equipment into communication equipment and civil-engineered equipment and defining them defines the communication equipment with respect to each apparatuses cable and management or testing system, and defines the civil-engineered equipment as classified into a central office (CO), remote terminal (RT) sites, ducts and aerial wiring. It divides underground civil-engineered equipment items, such as ducts, and aerial civil-engineered equipment at positions where cables can be drawn out, and holds information on these equipment items as so segmentalized. For each item of equipment, the maximum capacity, unoccupied capacity and cost information are held.

The means for designing whether or not each item of equipment, as defined for that item, is to be used in automatic designing holds for each item of equipment information on whether or not, in automatic designing, only the unoccupied capacities of existing equipment can be incorporated into the design as cost-free elements, and delivers that information to an automatic designing section.

The means for designating a deployment site for equipment by attributes of roads and the like and extracting it from map data reduces the time taken to define eligible deployment site information, which is usually enormous in volume.

Further the means for freely editing an eligible deployment site for equipment makes possible modification of the eligible deployment site, either newly defined or extracted by the foregoing means, according to the position where deployment of communication equipment is made impossible by official regulation or the presence of a park, river of the like.

The means for automatically designing an access communication equipment calculates a low deployment cost communication network first on the basis of whether or not, as defined for each item of equipment, the equipment is to be used in automatic designing (addition designing mode: yes/no—whether or not to fix positions and use unoccupied capacities as cost-free elements).

DESCRIPTION OF THE PREFERRED EMBODIMENTS

Preferred embodiments of the present invention will be described in detail below with reference to drawings.

Figure 1:
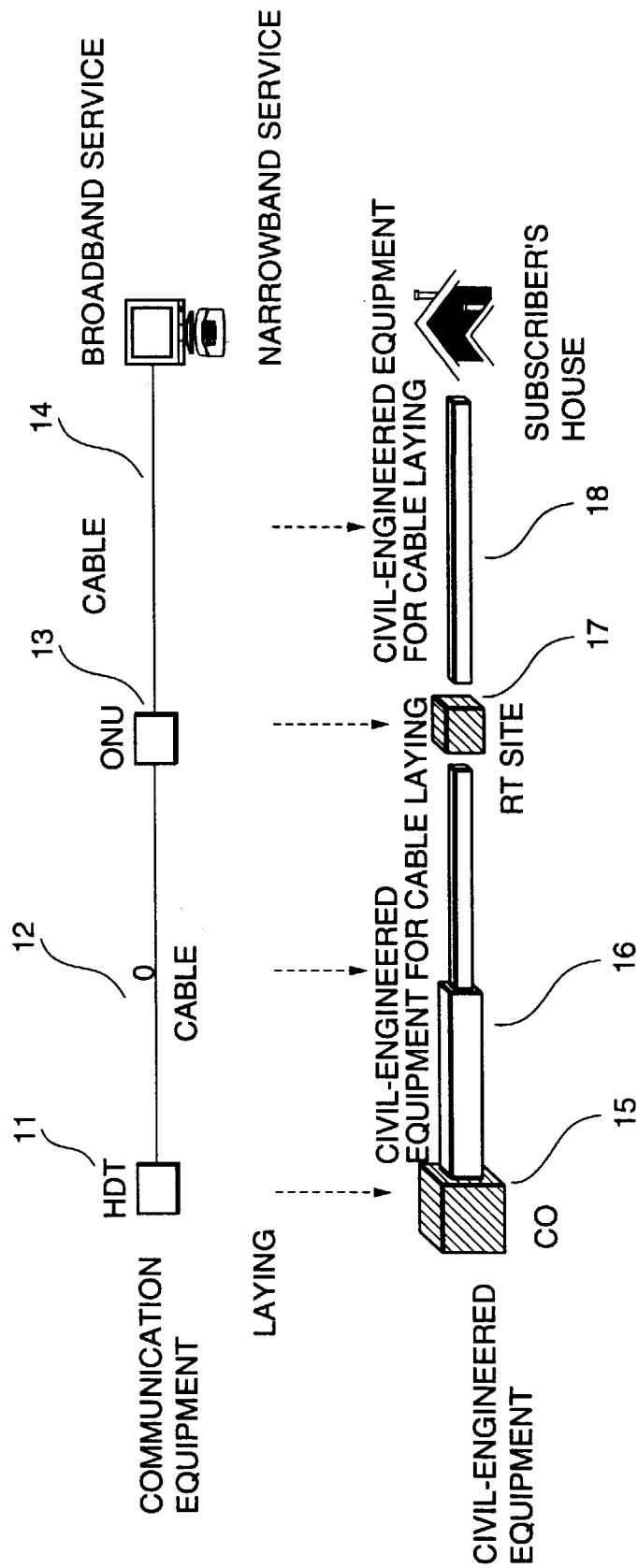
FIG. 1 is a digram illustrating a defining system for communication equipment and civil-engineered equipment according to the present invention.

FIG. 1 is a diagram for helping describe a defining system for equipment in an embodiment of the invention. Referring to FIG. 1, communication equipment is configured for a supposed access network comprising a host digital terminal (HDT) 11 to be installed in a central office (CO); and optical network unit (ONU) 13 to be installed in a remote terminal (RT) site within a subscribing building, on a curb or elsewhere; a cable 12 for connecting the HGDT 11 and the ONU 13; and another cable 14 for connecting the ONU 13 and a terminal in a subscriber's house.

Meanwhile, civil-engineered equipment is configured for a supposed access network comprising a CO 15; a cable-laying civil-engineered equipment item 16, such as a duct; an RT site 17; and another cable-laying civil-engineered equipment item 18. Here it can be defined for every item of equipment whether to not, in automatic designing, it should be fixed and automatically designed by an addition formula without affecting the corresponding existing equipment or to be deleted and automatically designed anew.

Figure 2:
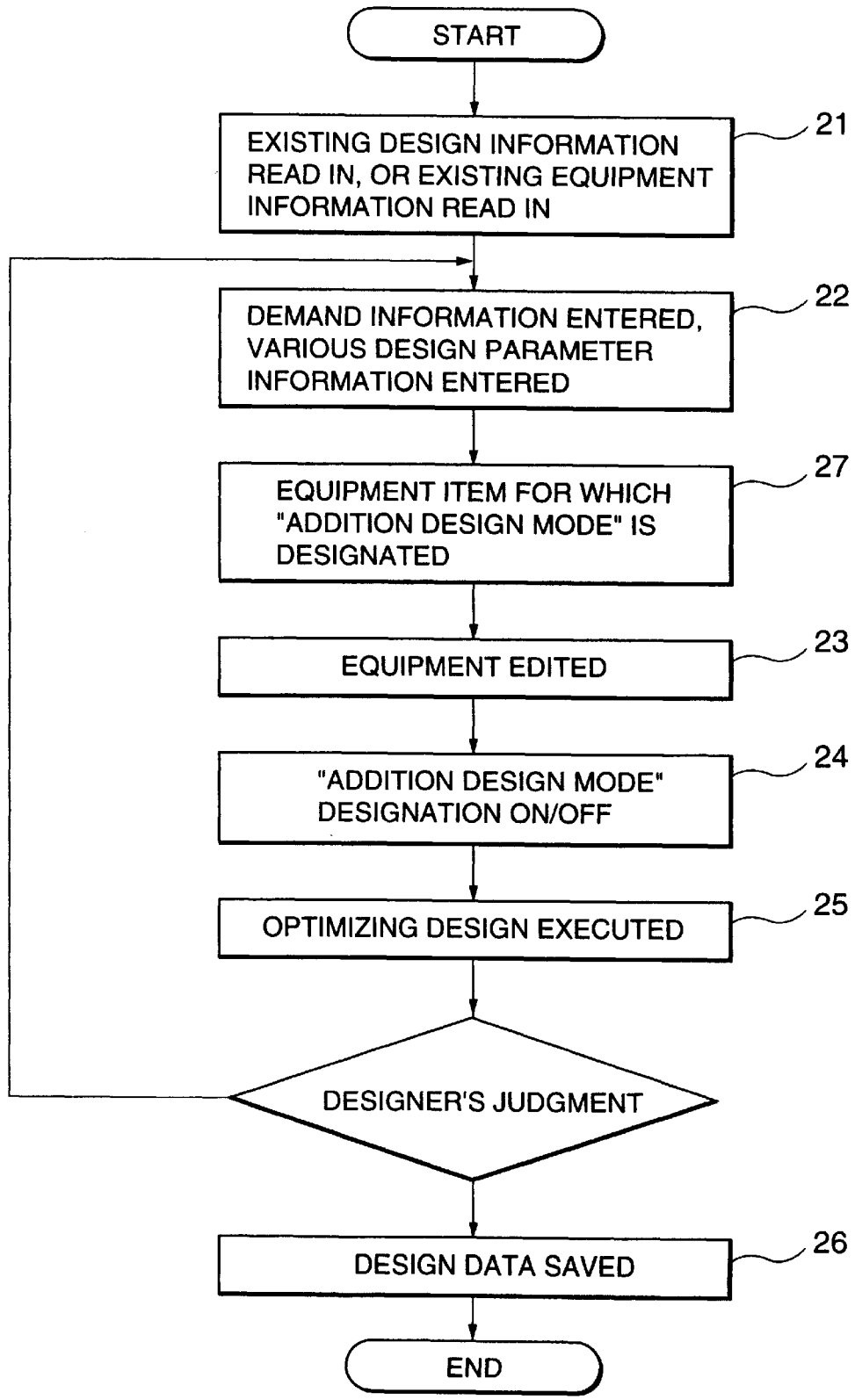
FIG. 2 is a diagram illustrating an addition designing system.
Figure 3:
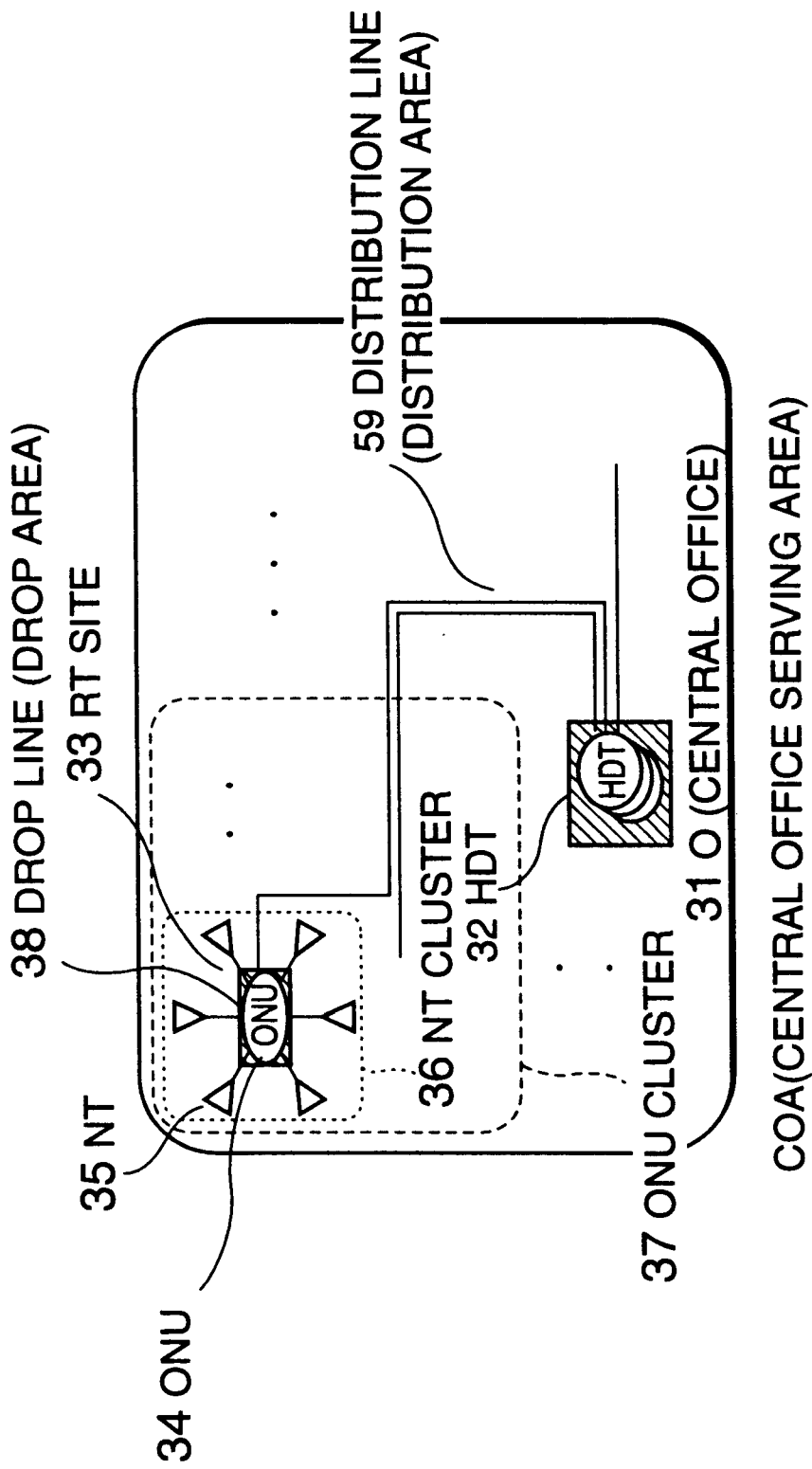
FIG. 3 is a diagram illustrating an example of access communication network.

FIG. 2 is a diagram illustrating the designing procedure of an addition designing system for the embodiment of the invention. Referring to FIG. 2, the procedure comprises a reading section 21 for existing design data or operating equipment data; an input section 22 for various design data; an equipment editing section 23; an addition designing mode designating section 24; and automatic designing section 25; and a saving section 26 for equipment data. It also has a judging section 27 for judging whether or not to forbid a change in any equipment item for which an addition designing mode is set.

Next will be described the operation of the embodiment of the invention with reference to FIG 2.

First, where existing equipment information is read in by the reading section 21, the design parameter input section 22 first defines the currently added demands. Next, where the read-in equipment information is to be altered, it can be done by the equipment editing section 23 as desired. Before editing, addition mode designation on/off 27 can be executed as well. The deployment cost of the equipment item added/deleted by this equipment editing section 23 is added to the total cost. Then, addition designing mode designation on/off can be designated by the addition designing mode designating section 24 to determine for each equipment item whether or not to use it in automatic designing by the addition formula.

Next, automatic designing is done by the automatic designing section 25. In this action, each equipment item for which the addition designing mode is designated is prohibited from being deleted or shifted; its currently unoccupied capacity is read in and used as being free from deployment cost; and the configuration and position of a low cost communication network using existing equipment are calculated.

Next will be described a case in which automatic designing is reiterated by the addition formula on the basis of previous data, i.e. equipment information already calculated.

First, the number of demands currently added is defined by the design parameter input section 22. Then, by the equipment editing section 23, any equipment item which actually exists but is not desired for inclusion in the current automatic designing by the addition formula is deleted, or any equipment item which is currently inexistent but is desired to be deployed before automatic designing is done by the addition formula is generated or shifted in advance.

As the equipment configuration is classified in definition into communication equipment and civil-engineered equipment, it is possible to accomplish automatic designing in which existing equipment items are used as classified into communication equipment and civil-engineered equipment. Then, for each equipment item, whether or not to use it in designing, i.e. addition designing mode designation on/off, is set (24 in FIG. 2). Next, automatic designing is done (25 in FIG, 2). In this action, each equipment item for which the addition designing mode is set is fixed in position; it is treated as being free from deployment cost; and the configuration of a communication network using existing equipment and the position of civil-engineered equipment needed therefor are calculated. This calculated equipment information is used as input values for the next addition designing, and the same procedure can be repeated on the basis of additional service demands.

To describe the aforementioned embodiment of the present invention in further detail, description of the embodiment will continue below with reference to drawings. In a central office servicing area (COA), which is the object of designing, there is an active double star-shaped access network of an FTTC (fiber to the curb)/FTTB (fiber to the building) form consisting of a host digital terminal (HDT) 32 housed in a central office (CO) 31; an optical network unit (ONU) 34 housed in a remote terminal (RO) site 33 either indoors or outdoors; and a network terminal (NT) 35 housed in a subscriber's house.

In a drop area, a plurality of network terminals (NTs) at a short distance are conveyed into an NT cluster 36, and housed in the ONU 34 within the same RT site 33. In a distribution area, a plurality of ONUs 34 at a short distance from one another are converged into an ONU cluster 37, and housed in the same HDT 32.

Figure 4:
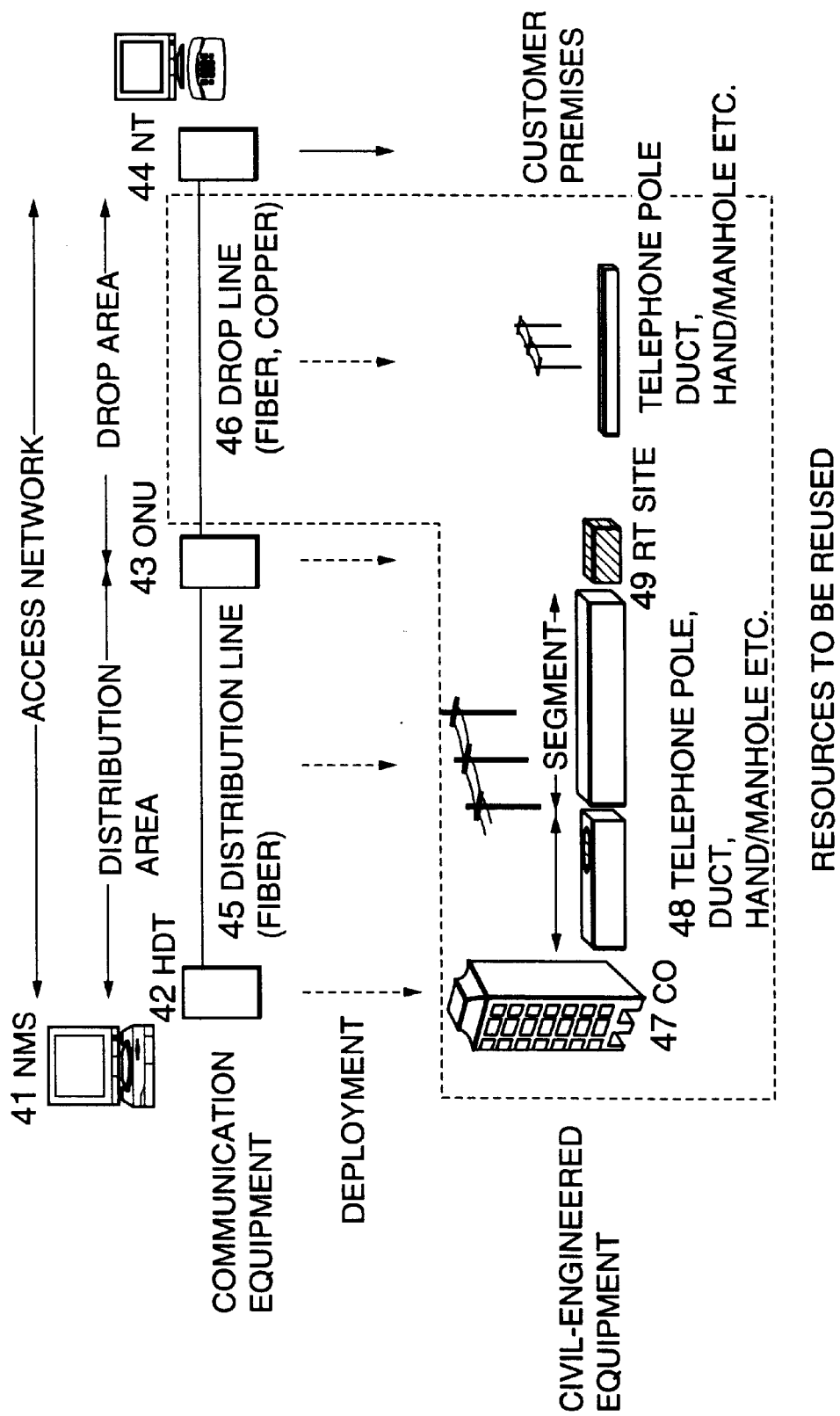
FIG. 4 is a diagram illustrating equipment and installation of an access network.

Meanwhile, the equipment items constituting the access network can be classified into communication equipment and civil-engineered equipment as shown in FIG. 4. The communication equipment here consists of a network management system (NMS) 41, an HDT 42, a distribution line 45, an ONU 43, a drop line 46 and an NT 44. The civil-engineered equipment consist of underground items including a duct 48, aerial items including aerial wiring 48 and items for housing a CO 47 and an RT site 49.

The civil-engineered equipment items are deployed within the constraints of roads and rivers among other things, and the communication equipment items are housed in them. More specifically, the HDT 72 and the ONU 43 are housed in the CO 47 and the outdoor or indoor RT site 49, respectively, and cables are housed in underground/aerial civil-engineered equipment items via drawing-out points. Within the aforementioned constraints, the automatic designing section calculates a low cost access communication network configuration on the basis of information edited by the proposing eligible deployment site defining section.

Figure 5:
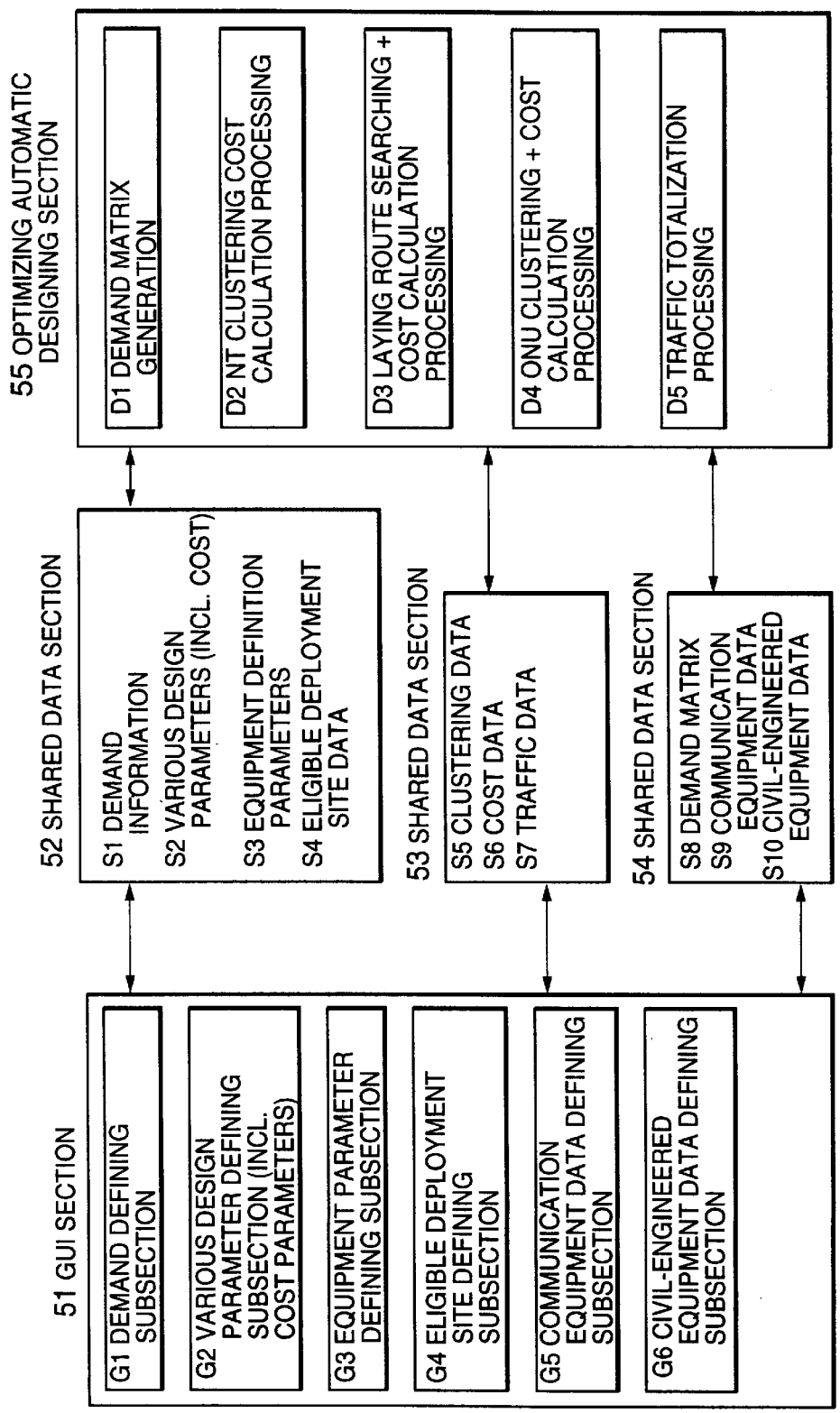
FIG. 5 is a diagram illustrating an example of system configuration.

FIG. 5 is a diagram illustrating a system configuration of the embodiment of the invention, comprising a graphical user interface (GUI) section 51, shared data sections 52, 53 and 54, and an optimizing automatic designing section 55.

The GUI section 51 consists of:
  a demand defining subsection G1 capable of defining subscription demands;
  a designing parameter defining subsection G2 capable of defining such parameters as the initial accommodation rate and the unit price of each equipment item;
  an equipment parameter defining subsection G3 capable of defining the scale and characteristics of each equipment item;
  an eligible deployment site defining section G4 capable of defining a site eligible for the deployment of equipment;
  a communication equipment data defining section G5 capable of entering new inputs into and even editing existing items of communication equipment; and
  a civil-engineered equipment data defining section G5 capable of entering new inputs into and even editing existing items of civil-engineered equipment.

The shared data sections 52, 53 and 54 are classified into three types according to rights to read from and/or write into the GUI section 51 and the automatic designing section 55.

The shared data section 52 can both read from and write into the GUI section 51 and only read from the automatic designing section 55. It consists of:
  Demand information S1 consisting of information on subscription demands and the type of call among other things;
  Various design parameters (including cost) S2;
  Equipment definition parameters S3; and
  Eligible deployment site data S4 containing information on eligible sites for the deployment of equipment.

The shared data section 53 can only read from the GUI section 51 and both read from ad write into the automatic designing section 55.
  Cluster data S5 containing NT cluster information, which is information on a group of NTs accommodated in the same ONU and ONU cluster information, which is information on a group of ONUs housed in the same HDT;
  Cost data S6 calculated on a COA-by-COA basis by the automatic designing section 55; and
  Traffic date S7 similarly calculated on a COA-by-COA basis by the automatic designing section 55.

The shared data section 54 can both read from and write into the GUI section 51 and the automatic designing section 55. It consists of a demand matrix S8, communication equipment data S9 and civil-engineered equipment data S10. All the data here in the shared data section 54 can be defined by the GUI section 51 and, further, the optimizing automatic designing section 55, reading them in, can calculate and update them on the basis of information in the shared data section 52, thereby making possible designing by the addition formula.

The automatic desinging section 55 consist of:
  a demand matrix generating section D1 for calculating, when the demand defining section has defined only numerical values, a demand matrix, which provides the basic data for all optimizing designs, on the basis of the defined values;
  NT clustering+cost calculation processing D2 for generating cluster date S5 (only for NT clusters here) on the basis of the shared data sections 52 and 54;
  Laying route searching+cost calculation processing D3 for calculating the optimal cable laying routes between the HDT and ONUs again on the basis of the shared data sections 52 and 54;

ONU clustering+cost calculation processing D4 for generating cluster data S5 (only for ONU clusters here) on the basis of the shared data sections 52 and 54; and a traffic totalization processing subsection D5 for totalizing COA-by-COA traffic data S7, for use in designing a backbone communication network, from the shared data sections 52 and 54.

Figure 6:
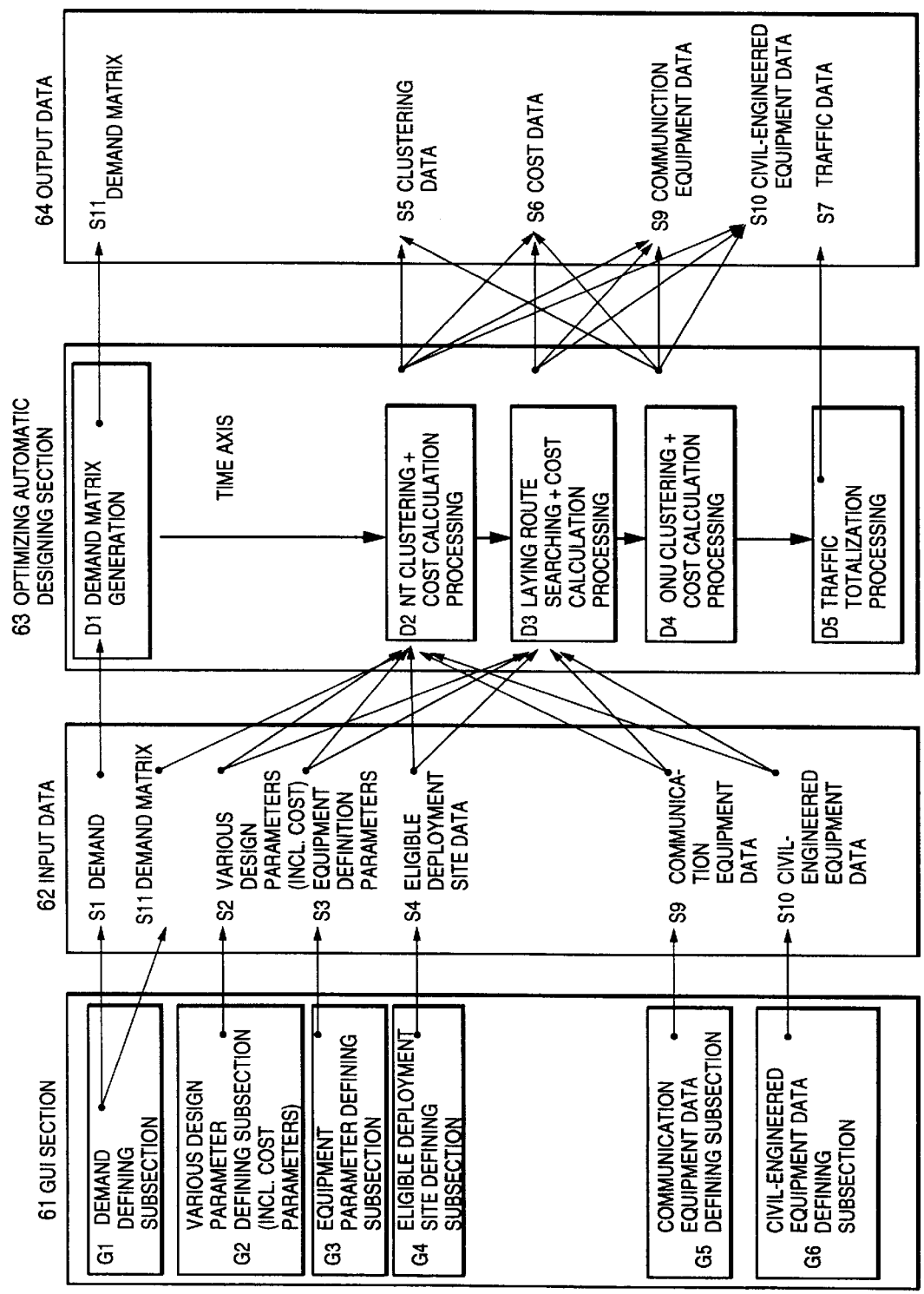
FIG. 6 is a diagram illustrating an example of design flow.

FIG. 6 a diagram for helping describe the system of one embodiment of the present invention, illustrates a design flow defining data inputs and outputs in the system. In FIG. 6, the shared data sections in the system configuration diagram are classified into input data and output data and, further, the sequence of the execution of design modules in the automatic designing section and input/output data for each module are shown in an organized way.

Each set of data in input 62 is entered by the network designer in accordance with a module related by an arrow in the GUI section 61. Each design module in an automatic designing subsection 63 is executed according to an arrow representing a time axis. In executing a design module here, input data 62 represented by an arrow are required, and its execution will result in the outputting of each set of data in output data 64 as indicated by an arrow. A demand matrix S11 in FIG. 6, though it can be directly entered from the demand defining subsection G1 of the GUI section 61, can as well be generated in the demand matrix generating section D1 from COA-by-COA numerical inputs, and accordingly it is contained in both the input data 62 and the output data 64. Also, both the communication equipment data S9 and the civil-engineered equipment data S10, because additional designing is used, can be input/output data for the automatic designing subsection 63.

Next will be described the NT clustering+cost calculation processing D2 and the laying route searching+cost calculation processing D3 in the automatic designing subsection 63. The addition designing formula is used in both of these processing sections.

Figure 7:
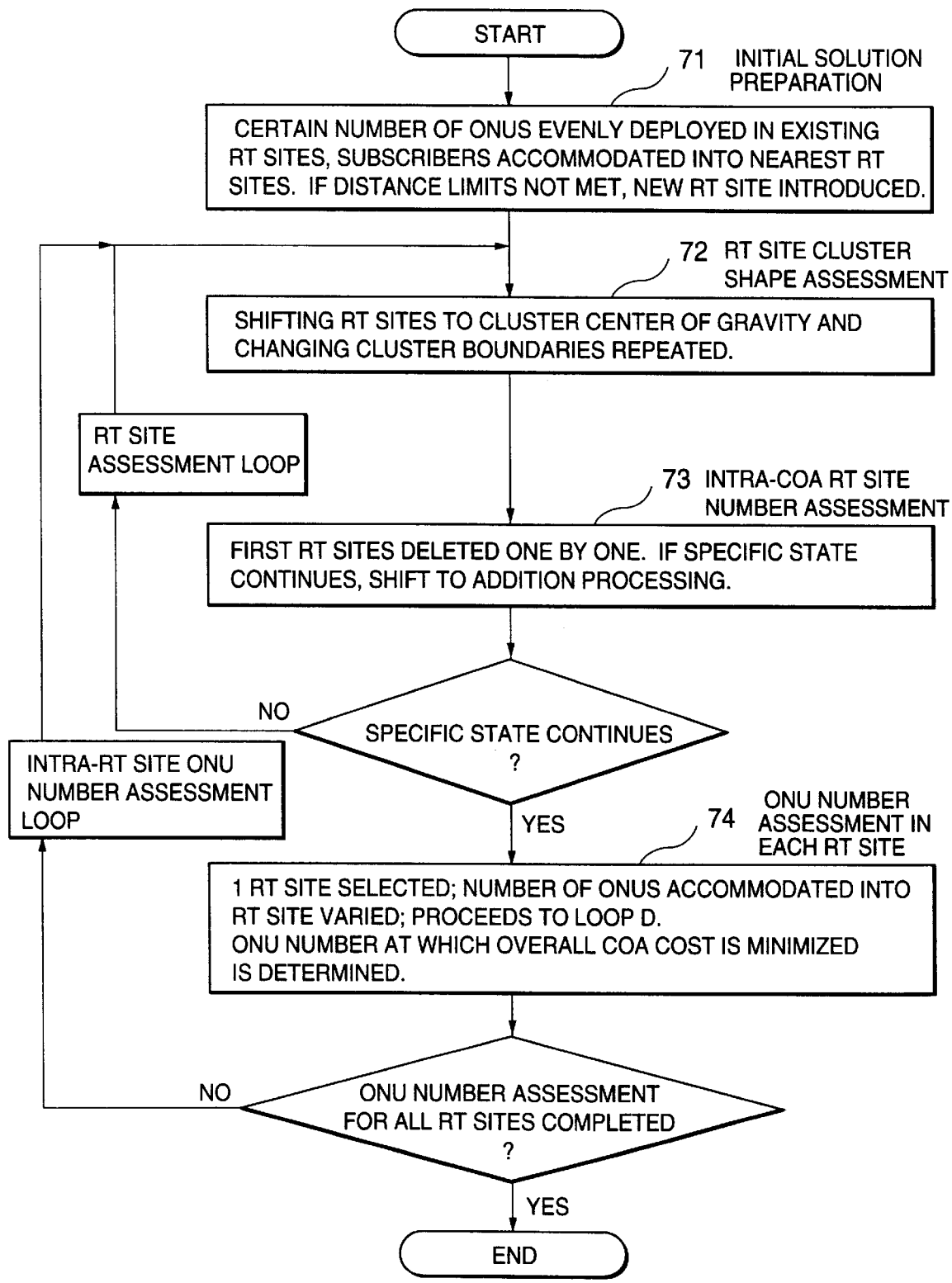
FIG. 7 is a diagram illustrating an example of NT clustering algorithm.

FIG. 7 illustrates an example of algorithm by which the NT clustering+cost calculation processing D2 calculates a configuration of a low cost access communication network on the basis of information on the unoccupied capacity designated for the designer with respect to each COA or each equipment item and whether or not each equipment item can be used in addition designing.

First, in initial solution preparation 71, a certain number of ONUs are evenly deployed in existing RT sites, and each subscriber is accommodated in the nearest RT site. If, in this procedure, there is an existing ONU, its unoccupied capacity will be used by accommodation processing as being free of laying cost. If subscriber and distance limits are not met, a new RT site will be introduced, and this processing will be continued until the distance and other constraints are satisfied.

Next, in an RT site cluster shape assessment procedure 72, it is assessed accomomdation into the ONU of which RT site would minimize the cost for each subscriber. More specifically, shifting RT sites to the center of gravity of the cluster and accommodation of subscribers into the ONUs of the respectively least costly RTs are executed repeatedly until the cost can be reduced no more.

Further in an intra-COA RT site number assessment procedure 73, an RT site assessment loop 75 is executed until the deployment cost can be reduced no more after variations in accommodation cost are calculated with the number of sites increased or decreased as well. In this assessment processing, too, unoccupied capacities are given priority in allocating subscribers as involving no additional equipment cost.

Finally, in an intra-RT site ONU assessment section 74, with the deployment of a plurality of ONUs in each RT site being taken into account, first one RT site is selected and, by increasing or decreasing the number of ONUs therein, the quantity at which the cost in the whole COA is minimized is search for via an intra-RT site ONU number assessment loop 76. The above-described processing is repeated until the intra-RT ONU number assessment loop 76 in every RT site is executed. In this assessment processing, too, unoccupied capacities are given priority in allocating subscribers as involving no additional equipment cost.

Figure 8:
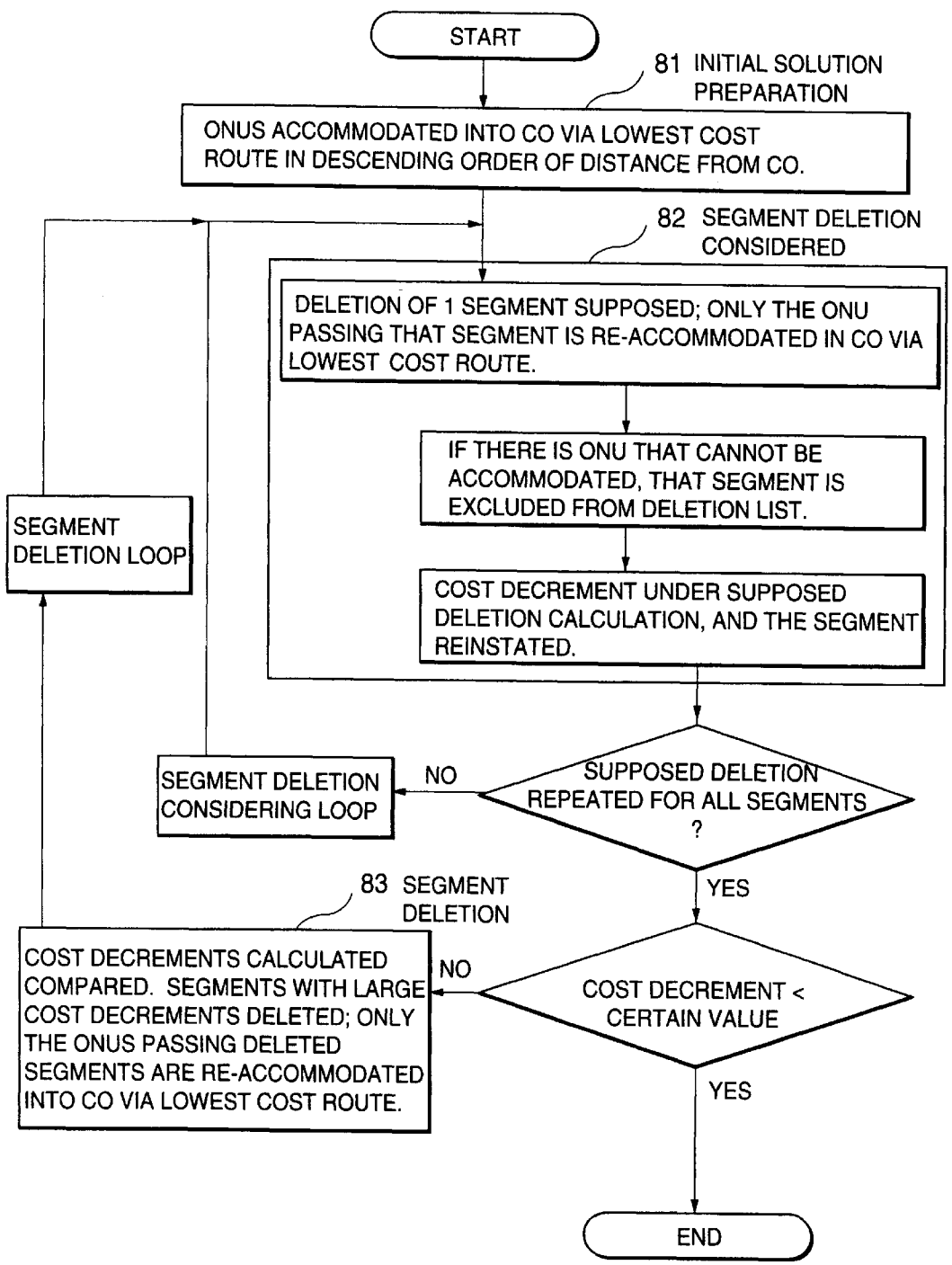
FIG. 8 is a diagram illustrating an example of route searching algorithm.

FIG. 8 illustrates an example of algorithm by which the laying route searching+cost calculation processing D3 calculate a configuration of a low cost access communication network on the basis of information on the unoccupied capacity designated for the designer with respect to each COA or each equipment item and whether or not each equipment item can be used in addition designing.

As shown in FIG. 4, whereas the units of processing are such as HDT 42, ONU 43, NT 44, cables 45 and 46, CO 47 and RT site 49, aerial/underground civil-engineered equipment items for cable laying are segmentalized with respect to points where the cables are drawn out or branched, and the segments are matched with the branches of the graph used in laying route searching. Therefore, existing equipment items are also treated in these units.

First, in an initial solution preparation procedure 81, the segments are accommodated into the CO by the lower cost route, weighted with the laying cost, as branches of the graph in the decreasing order of the ONU's distance from the CO.

Then, in a segment deletion considering procedure 82, deletion of one segment is supposed, and only the ONU passing that segment is accommodated again into the CO by the lowest cost route.

The cost decrement in the whole COA in the supposed case of deletion is calculated, and the segment is reinstated. If there is any ONU that cannot be accommodated here, the corresponding segment is exclude from the list of segments to be deleted. Until possible deletion is considered for all the segments, a segment deletion considering loop 84 is turned to continue the processing.

Further in a segment deletion procedure 83, segments whose contributions to the cost decrease calculated in the segment deletion considering procedure 82 are the greatest are deleted. If a plurality of segments not correlated to each other are to be deleted, they are deleted simultaneously. Only the ONUs passing the deleted segments are accommodated again into the COby the lowest cost route.

A segment deletion loop 85 is repeated until the cost can be reduced no more.

In the foregoing processing, too unoccupied capacities of existing equuiipment are given priority in allocating subscribers as involving no additional equipment cost.

As hitherto described, the present invention provides the following benefits.

A first benefit of the invention is improved accuracy of the calculation of the configuration of a low cost access communication network because civil-engineered equipment and communication network are separated from each other in executing communication network designing.

The reason is that, as the installation cost of civil-engineered equipment is enormous and moreover it has to accommodate a plurality of sets of communication equipment, the cost cannot be accurately assessed unless the reuse of existing equipment is presupposed.

A second benefit of the invention is that it permits designation of an exceptional position of deployment.

The reason is that the invention allows the designer to enter the eligible deployment site in a position he or she prefers.

A third benefit of the invention is that it permits, by only designating one type of addition designing mode for each equipment item, designing by an addition formula without affecting existing equipment, designing by an addition formula based on the results of previous designing, and designing by an additional formula for a plurality of years.

The reason is that, according to the invention, each equipment item, at the time of automatic designing, is assigned information regarding whether it is to be deleted or its position is fixed to use its unoccupied capacity and, on the basis of that information, the absence of any additional equipment cost is assusmed when the unoccupied capacity is to be used.

What is claimed is:

1. An access communication network designing system for automatically calculating the configuration of an access communication network to reduce the deployment cost and its deployment position form geographical information within the design area, subscription demand information, equipment information and design parameter information including the initial accommodation rate, comprising:

equipment defining means for defining positional information and equipment information, making distinction between communication equipment including apparatuses, cables, and management or control systems, and civil-engineered equipment including ducts and aerial wiring;

eligible deployment site defining means for defining a site where the communication and/or civil-engineered equipment can be deployed; and automatic designing means for automatically calculating the configuration of a low deployment cost assess communication network and civil-engineered equipment needed therefor by an addition formula which, on the basis of edit inputs or already automatically calculated equipment information, prohibits any shift or deletion of existing equipment and thereby keeps already accommodated lines unaffected.

2. An access communication network designing system, as claimed in claim 1, wherein said equipment defining means is provided with:

communication equipment defining means editing and/or defining the types and positions of communication equipment including apparatuses, cables, management or control systems and, in automatic designing, whether or not to fix the positions of these items of communication equipment and use unoccupied capacities, and civil-engineered equipment defining means for editing and/or defining the types and positions of civil-engineered equipment including ducts, aerial wiring and, in automatic designing, whether or not to fix the positions of these items of civil-engineered equipment and use unoccupied capacities; and calculates the configuration of the access communication network and the civil-engineered equipment needed therefor.

3. An access communication network designing system, as claimed in claim 1, wherein said eligible deployment site defining means is provided with:

eligible deployment site extracting means for designating attributes of a map object from map data and extracting it as an eligible deployment site for equipment; and deployment site editing means for editing the eligible deployment site; and calculates the configuration of the access communication network and the civil-engineered equipment needed therefor.

4. An access communication network designing system, as claimed in claim 1, wherein:

said automatic designing means judges from the information designated by said equipment defining means whether or not to use communication and/to civil-engineered equipment; if any is to be used, uses only the unoccupied capacities of existing equipment without shifting or deleting any existing equipment; and automatically calculates the configuration of a low deployment cost access communication network and civil-engineered equipment needed therefor.

5. An access communication network designing method whereby equipment information is defined as classified into communication equipment and civil-engineered equipment, comprising:

(a) a step to enter design information or existing equipment information;

(b) a step to enter design parameter information on the number of additional demands, equipment cost and designing system;

(c) a step to edit entered communication/civil-engineered equipment as needed;

(d) a step to decide whether or not to use each item of communication and civil-engineered equipment by an addition formula in automatic designing, i.e. to designate/cancel an addition designing mode; and (e) a step to automatically calculate the configuration of an access communication network and civil-engineered equipment needed therefor by fixing the position of any of said equipment items of which the addition designing mode has been designated and using the unoccupied capacity of the existing equipment as involving no additional deployment cost.

6. A computer-readable recording medium in which is recorded a program to have a computer execute:

(a) processing to enter equipment information defined as classified into communication equipment and civil-engineered equipment;

(b) processing to enter design parameter information on the number of additional demands, equipment cost and designing system;

(c) a step to edit entered communication/civil-engineered equipment as needed;

(d) a step to decide whether or not to use each item of communication and civil-engineered equipment by an addition formula in automatic designing, i.e. to designate/cancel an addition designing mode; and (e) a step to automatically calculate the configuration of an access communication network and civil-engineered equipment needed therefor by fixing the position of any of said equipment items for which the addition designing mode has been designated and using the unoccupied capacity of the existing equipment as involving no additional deployment cost.

7. An access communication network designing system including:

means for defining equipment as classified into communication equipment civil-engineered equipment;

means for designating whether or not each item of said equipment is to be used in automatic designing by an addition formula;

means for protecting existing equipment by prohibiting editing of each item of equipment for which the addition editing mode is designated; and means for automatically calculating, in automatically designing the configuration of a low deployment cost access communication network and civil-engineered equipment needed for that configuration according to information on whether or not to use each item of equipment, as designated for that item, in automatic desinging and, in the addition designing mode, fixing its position and using its unoccupied capacity.

8. An access communication network designing system, as claimed in claim 7, including:

means for designating a deployment site for equipment by attributes of roads and the like and extracting it from map data; and means for editing an eligible deployment site for said equipment.

* * * * *